Patented Sept. 23, 1941

2,256,618

UNITED STATES PATENT OFFICE 2,256,618

METHOD OF MAKING ABRASIVE ARTICLES OF RESIN BONDED ABRASIVE GRAINS

Samuel S. Kistler, West Boylston, and Carl E. Barnes, Worcester, Mass., assignors to Norton Company, Worcester, Mass., a corporation of Massachusetts No Drawing. Application September 1, 1938, Serial No. 228,004

5 Claims. (Cl. 51—293)

This invention relates to articles of resin bonded granular material and particularly to articles, such as grinding wheels, made of grains united by a resin formed by a polymerizable unsaturated methylene compound.

In accordance with our prior applications, Serials Nos. 187,549 to 187,552 inclusive, filed January 28, 1938, we have proposed to make an abrasive article by bonding abrasive grains with various polymerized compounds comprising esters of acrylic acid and methacrylic acid, and the present application is a continuation in part thereof.

The primary object of our invention is to provide an article of granular material bonded by a polymerized unsaturated methylene compound. A further object is to provide a method of making such a porous article of resin bonded granular material wherein the volume percentages of the grains, the bond and the pores may be controlled and a predetermined structure obtained.

Another object is to provide methods of making articles of abrasive grains bonded by polymerized unsaturated methylene compounds which may be easily and readily manufactured and their structure duplicated at will. Further objects will be apparent in the following disclosure.

In accordance with one aspect of our invention, we propose to make an article of granular material, such as abrasive grains, bonded by a polymerized unsaturated methylene compound by mixing the grains with the bond in definite proportions adapted to provide a predetermined structure, and wherein the bond is of such nature and physical characteristics that it will unite with the grains and form an integral hard structure therewith. We particularly propose to make a porous structure or one of controlled volume percentages of abrasive, bond and pores. In order to make such a structure having a desired porosity, we may utilize an unsaturated non-conjugated methylene compound in a viscous condition, which is capable of wetting the grains and yet is not so fluid that it will flow freely and fill the pore spaces therebetween; or we may employ a linear chain type of unsaturated methylene compound or one that is cross linked with another polymerizable compound having a plurality of non-conjugated $CH_2=$ groups capable of independent polymerization and of cross linking with the linear chain molecule. The bond is used in a solid or a semi-solid state which permits it to be intermixed with the grains in required proportions and to develop a plastic body therefrom so as to form an article of predetermined porosity characteristics. We may also so carry on the process that required proportions of granular material, bond and pores may be obtained, or so that the volume structure of the article may be made in a predetermined manner and particularly in accordance with the methods set forth in the patent to Howe and Martin No. 1,983,082 of December 4, 1934 and the patent to Beecher and Quick No. 2,140,650 of December 20, 1938.

In order that the invention may be more fully understood, various examples of our compositions and procedure will be given. Of the unsaturated methylene compounds containing but one polymerizable $CH_2=$ group per molecule that may be used, we particularly prefer to employ the acrylic acid and alpha substituted acrylic acids or their esters which are polymerizable to form a satisfactory bond. The acrylic acid and substituted acrylic acids or their esters may be polymerized alone with the granular material, or such acids or esters may be copolymerized with compatible agents capable of imparting hardness, toughness, wearability, adhesion or other desired characteristics to the bond. For example, acrylic acid or alpha substituted acrylic acids may be used as hardening agents for any of the esters of said acids and thereby forming a linear chain type of polymer. Also, the esters of acrylic acid or alpha substituted acrylic acids may be used with a further polymerizable cross linking substance containing more than one unsaturated methylene group per molecule, wherein each unsaturated group is capable of independent polymerization and is not conjugated with another ethylenic linkage, such as a polyhydric alcohol ester of acrylic acid or an alpha substituted acrylic acid. As examples of the polyhydric alcohols, we may use ethylene glycol, diethylene glycol, triethylene glycol, glycerol, pentaglycerol, trimethylene glycol, pentaerythritol, mannitol and trimethylolpropane. Further examples of substances containing more than one unsaturated methylene group per molecule are the acrylic acid and methacrylic acid anhydrides, and the allyl esters of acrylic and methacrylic acids.

These various substances are liquids in their monomeric condition and are capable of being polymerized by heat to a hard substance that will serve as a bond. Methyl methacrylate, for example, will polymerize to a solid body which softens at a comparatively low temperature. It is capable of acting as a bond, but it may be copolymerized with a hardening agent which will raise the softening point or render it infusible or otherwise improve its hardness and other bonding characteristics. In the following examples, methyl methacrylate is given as the base substance which may be used alone or in association with various modifying agents; but it is to be understood that other esters of acrylic acid or the alpha substituted acrylic acids may be used as the base substance in the processes covered by this case.

In order to make a porous body of bonded granular material, such as abrasive grains of the type of crystalline alumina, silicon carbide, boron carbide, diamonds, etc., we may make a viscous polymerizable liquid to serve as the bond and mix this viscous liquid with the abrasive grains in such a condition that its viscosity is sufficient to prevent the bond from flowing freely except enough to coat the grains, and the bond is used in amount preferably insufficient to fill the pores between the grains. This viscous liquid may be made by partially polymerizing the bonding substance, such as by subjecting it to sufficient heat for the purpose. After the viscous resin has been mixed with the grains and the mass molded to a required shape, the bond may be later subjected to further heat in the presence of the abrasive grains to complete the polymerization and form an integral structure.

As an example of the use of a partially polymerized resin formed of a non-conjugated unsaturated methylene compound, we may heat monomeric methyl methacrylate with 0.02% of benzoyl peroxide at 80° C. for about one hour to partially polymerize the same. This material may be employed as such with the abrasive grains, or it may be mixed with another polymerizable monomeric substance, such as methacrylic acid or any of the other hardening agents above discussed. A suitable bond for a grinding wheel may comprise 272 grams of the partially polymerized viscous methyl methacrylate mixed with 100 ccs. of methacrylic acid. This substance may then be incorporated with the abrasive grains in suitable proportions, depending upon the structure characteristics desired. For example, one may utilize 1656 grams of abrasive with the amount of bond above specified; and this mixing may be accomplished in a suitable mixing kettle, such as one having rotating paddles adapted to thoroughly stir the mass and cause the bonding fluid to wet or coat the grains and form an intimate contact therewith and to be substantially uniformly interspersed throughout the mass. After the mixing operation has been completed, the mass may be shaped in a suitable mold and thereafter heated to a temperature of 60 to 100° C. to complete the polymerization of the bond. The temperature and time conditions may, however, be widely varied, as will be readily understood by one skilled in the art.

It will be appreciated that the porosity of the article as thus made will depend upon the relative proportions of the grain and the bond. Since the bond is present in amount insufficient to fill the pore spaces, then the bond coated grains will lie substantially in contact, with the pores therebetween determined by the size and the shapes of the abrasive grains. It will also be appreciated that one may use the bonded grains in such proportions as to form a mass having large air spaces therein and which may be compressed to a smaller volume. This may be accomplished in accordance with the method set forth in the Howe and Martin Patent No. 1,983,082 and the volume structure of the article will be thereby fully determined. Since the abrasive and the bond are substantially incompressible, these substances will be used in proportions which leave air spaces of a volume which may be decreased by suitable pressure, and these proportions may be widely varied to give bonded structures of all required degrees of hardness as well as of desired volume percentages of abrasive or bonds or pores.

As a further method within the scope of our invention for making an article of required porosity or structure, we may employ a fully polymerized unsaturated methylene resin such as methyl methacrylate, or this base substance may be copolymerized with a cross linking agent, such as pentaglycerol trimethacrylate. This agent may be copolymerized with methyl methacrylate in the proportions of 100 ccs. of the former to 390 ccs. of the base substance. Various other proportions may be used. This intermixture of monomers may be copolymerized as a solid mass and then ground or pulverized to granules of desired particle size for subsequent use.

Or, the methyl methacrylate or other monomeric substances may be polymerized as a fine molding powder by adding the same in the required amounts, together with a small amount of benzoyl peroxide, to a quantity of carbon tetrachloride or other solvent with which the liquid monomer is completely miscible while the polymer is insoluble therein. This mass may be then placed on a constant temperature bath maintained at 65° C. After an induction period of about five hours, the polymer, which is insoluble in the carbon tetrachloride, begins to precipitate as a fine powder and it may be filtered off and washed with more of the carbon tetrachloride and then dried. We may make an abrasive article of this powdered substance by mixing for example 1656 grams of abrasive grain with 500 grams of the powdered polymerized methyl methacrylate or with such a base substance copolymerized with a hardening agent. The copolymers above listed are all available for making such a molding powder, but it is desirable to use limited amounts of the hardening agent, ordinarily from about 5 to 30%. As a further example, we may employ as the molding powder methyl methacrylate copolymerized with a hardness improving agent, such as an ester of acrylic acid or alpha substituted acrylic acids with allyl alcohol or with a polyhydric alcohol of the types above specified. The dry molding powder may be softened or plasticized by means of a suitable agent which is capable of dissolving or otherwise plasticizing the bond and causing it to adhere firmly to the grains. Methyl methacrylate in its fully polymerized condition may be softened on the exposed surfaces of the resin particles by means of the monomeric liquid methyl methacrylate, for example, which is a solvent for the polymer. This may be accomplished by mixing the liquid monomer with the dry polymer in a suitable mixing machine; or we may first wet or coat the abrasive grains with the liquid monomer and thereafter mix in the dry polymeric powder and thus cause it to adhere to the grains as a coating thereon. The proportions of the two ingredients may be widely varied, since any excess of the monomer is ultimately converted to a hard condition by polymerization. It is desirable to use enough liquid solvent to insure that all of the abrasive grains are fully coated therewith and to insure that the polymerized powder adheres intimately thereto. We may incorporate a slight amount of a catalyst, such as 0.02% of benzoyl peroxide, in the liquid monomeric substance to insure its complete polymerization during the later heating stage. This plastic mixture of grains and softened polymeric bond may be suitably shaped, as by pressure in a mold, and thereafter heated to a temperature sufficient to convert the monomer to its polymeric form and thus form a hard bond which unites the grains integrally in place. We may use many types of polymerizable substances, such as monomeric vinyl acetate or styrene, which will serve as plasticizers by sticking to both the grains and the dry molding powder and which may be thereafter converted by heat to a hard polymeric condition. The mass of grains and the softened or plasticized resin powder may be shaped as desired, such as by being placed in a mold and subjected to a pressure of several tons in a hydraulic press, after which the bond is polymerized by heat.

A copolymer of 20% methacrylic acid and 80% methyl methacrylate has a tensile strength of about 455 pounds per square inch at 160° C. and a tensile strength of about 1500 pounds per square inch at 130° C. This thermoplastic copolymerized substance may be molded under a high pressure of 1500 to 6000 pounds per square inch at 175° to 200° C. without the use of a solvent. This substance may be formed as a molding powder as above indicated, and then the abrasive grains may be wet with a small amount of monomeric methyl methacrylate which will serve as a solvent for the polymerized resin. This solvent may be used in suitable proportions, such as 5 or 10%, and preferably in amount sufficient to thoroughly wet the grains and dissolve a considerable amount of the hard resin to form a plastic mass which causes the grains and resin particles to cohere. The solvent is a polymerizable substance, and upon heating the intermixture of grains and plastic bond to a temperature of about 160° C. to 200° C., the solvent will be polymerized in intimate association with the resin particles and the grains.

It will now be appreciated that various other compositions and methods of procedure may be employed within our invention and the above examples are to be considered as illustrative and not as being limitations on the scope of the appended claims. The term "polymerizable unsaturated methylene compound" is to be interpreted as covering any compound of this type which has the unsaturated group $CH_2=$ and is capable of polymerization to form a useful bond for abrasive grains and other granular material. Also, the compounds which will form hard and somewhat brittle abrasive bonds are those in which the unsaturated methylene groups are not conjugated with other ethylenic linkages, and the term "non-conjugated" as used herein is to be interpreted accordingly. For example, in addition to the acrylic acid derivatives above mentioned, we may use vinyl chloride, vinyl acetate, vinyl chloracetate, styrene, methyl vinyl ketone and various other compounds of this type which are used alone or as copolymers with other unsaturated methylene compounds and may be polymerized to a hard condition. Hence, the claims are to be interpreted accordingly. Part of the subject matter disclosed herein is claimed in our copending application Serial No. 316,212 filed January 29, 1940. The subject matter pertaining to the compositions of the resins and articles made therefrom is reserved for other applications.

We claim:

1. The method of making an abrasive article of resin bonded granular abrasive material comprising the steps of treating a polymerizable substance containing a monomeric unsaturated mono-methylene compound containing the group $CH_2=C-$ to polymerize said compound partially and provide a viscous mass which is capable of adhering to the grains without filling the pore spaces therebetween, incorporating said viscous substance and the abrasive grains in predetermined proportions to form a porous moldable mass of required structure and shaping an article therefrom and heating the mass to complete the polymerization of said substance and convert it into a solid mass which bonds the grains integrally as a hard abrasive structure.

2. The method of making an abrasive article of resin bonded granular abrasive material comprising the steps of providing a bond containing a soluble polymerized unsaturated non-conjugated methylene compound and a monomeric unsaturated methylene compound capable of wetting the grains and of dissolving the polymerized compound which contain $CH_2=C-$ groups and are proportioned to provide a viscous mass capable of adhering to the grains without filling the pores therebetween, incorporating said viscous bond and abrasive grains in proportions for providing a porous article of required structure, shaping an article therefrom, and heating the mass to polymerize the monomeric substance and thereby forming a solid abrasive body.

3. The method of making an abrasive article of resin bonded granular abrasive material comprising the steps of polymerizing and forming a powder of a polymerizable unsaturated methylene compound, mixing predetermined proportions of abrasive grains, said powder and a monomeric solvent for the powder which is a polymerizable unsaturated methylene compound capable of wetting the grains and forming a coherent plastic porous mass, each of said compounds containing $CH_2=C-$ group shaping an article therefrom, and heating the article to complete the polymerization of the bond and form a solid body thereof.

4. The method of making an abrasive article of resin bonded abrasive material comprising the steps of heating a fully polymerizable substance comprising an unsaturated mono-methylene compound and providing a powder thereof, wetting the grains with a polymerizable substance comprising a monomeric unsaturated methylene compound capable of producing a plastic mass, and forming a porous molded article of predetermined proportions of said ingredients and a desired porosity and structure, and heating the article to polymerize any monomeric substance present and form a solid body.

5. The method of making an abrasive article of resin bonded abrasive grains comprising the steps of providing a polymeric thermoplastic powder and a monomeric substance containing as its primary ingredient an unsaturated methylene compound, containing a $CH_2=C-$ group incorporating predetermined proportions of abrasive grains, said powder and the monomeric substance, heating and pressing the mass to form a shaped article, and polymerizing the monomeric substance and forming a fully polymerized solid body.

SAMUEL S. KISTLER.
CARL E. BARNES.